A. F. WIKING.
SELF UNLOADING BARGE.
APPLICATION FILED SEPT. 28, 1909.
986,529.
Patented Mar. 14, 1911.
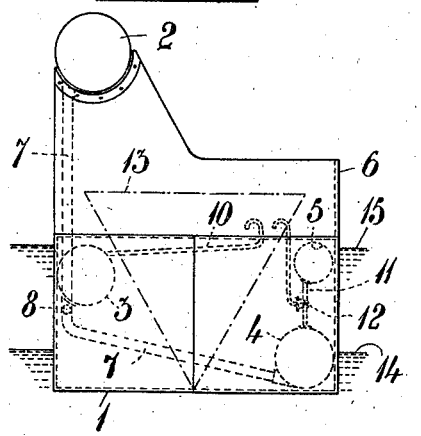
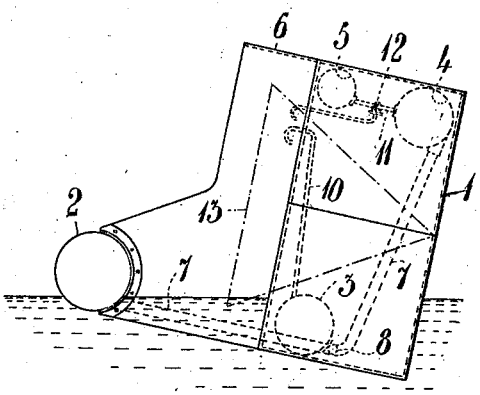
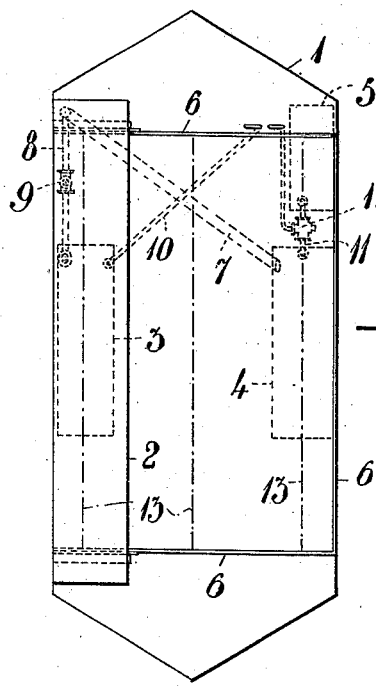
WITNESSES
W. P. Burke
A. F. Heuman
INVENTOR
Anders Fredrik Wiking
BY Wm Wallace White
ATTY.

UNITED STATES PATENT OFFICE.

ANDERS FREDRIK WIKING, OF STOCKHOLM, SWEDEN.

SELF-UNLOADING BARGE.

986,529.  Specification of Letters Patent.  Patented Mar. 14, 1911.

Application filed September 28, 1909. Serial No. 519,907.

*To all whom it may concern:*

Be it known that I, ANDERS FREDRIK WIKING, mechanical engineer, a subject of Sweden, residing at Slussplan 63$^B$, Stockholm, Sweden, have invented new and useful Improvements in Self-Unloading Barges, of which the following is a specification.

The present invention has for its object to substitute for the barges now in use having trap-doors in the bottom such ones without such mechanical arrangements and with greater loading capacity for the same initial cost.

In the accompanying drawing such a barge is illustrated in a side-view in erect position in Figure 1 and in turned-over position in Fig. 2; Fig. 3 is a plan view.

The barge consists of a hull 1 supporting a higher situated cylindrical or other suitable receptacle 2 and provided on three sides with walls 6, inside which the load is placed, in a triangular shaped hold 13.

The barge being loaded to a certain, fixed draft (from the light water-line 14 to the load water-line 15 in Fig. 1), water or other liquid is introduced into the receptacle 2. After a sufficient quantity of water has been introduced, the barge loses its equilibrium and turns over, so that the load is tipped out. The receptacle 2 should be of such a displacement, that the barge cannot turn entirely over, but is checked in the position shown in Fig. 2. The load having been dumped, the barge practically resumes its original, erect position either at once or after some water has been removed from receptacle 2.

For introducing the water in and removing the same from the receptacle 2 several different means may be used, one of which is illustrated in the drawing. It consists of a receptacle 3, placed in connection on one side with the open air, for instance by a pipe 10, on the other by a pipe 8, provided with a valve 9 with a pipe 7 said pipe 7 connecting the receptacle 2 with a lower situated receptacle 4 for water or any other liquid. This last-mentioned receptacle in its turn is connected to a receptacle 5 for compressed gas by a pipe 11 and to the open air by a three-way cock 12 inserted in said pipe.

When the barge has been conveyed to the dumping-place, the cock 12 is moved so that the compressed gas in the receptacle 5 flows into the receptacle 4, whereby the liquid in the latter is pressed through the pipe 7 to the receptacle 2, and the barge is turned over either to the extreme position in Fig. 2 or only sufficiently for dumping the load. The load being tipped off, the cock 12 is put in such a position, that the receptacle 4 comes in connection with the open air, and then if necessary for the raising the valve 9 is opened, whereby water from the receptacle 2 flows down to the lower receptacle 3. In this latter case after a certain quantity of water has passed into the latter, the barge again assumes an erect position, whereupon the contents of the receptacles 2 and 3 flow back to the receptacle 4.

The two valves 9 and 12 can be operated in any appropriate manner, for instance by means of mechanical gearing from some suitable place so that the barge by means of cords or the like may be operated from another vessel.

Having now particularly described and ascertained the nature of my said invention and in what manner the same is to be performed, I declare that what I claim is:

1. A self-unloading barge, comprising a floating body, a liquid containing receptacle positioned below the deck thereof and at one side of the floating body, a receptacle located above the deck and at the other side of the floating body, and means for transferring liquid from said first receptacle to said second receptacle.

2. A self-unloading barge comprising a floating body, a liquid-containing receptacle positioned below the deck thereof and at one side of the floating body, another receptacle located above the deck and at the other side of the floating body, a conduit extending between said receptacles, means for forcing the liquid from the first mentioned receptacle through said conduit into said second mentioned receptacle to tilt the barge into un-loading position, and means for returning the liquid from said second mentioned receptacle to said first mentioned receptacle to cause the barge to assume its normal position.

3. A self-unloading barge comprising a floating body, a liquid-containing receptacle positioned below the deck thereof and at one side of the floating body, a receptacle located above the deck at the other side of the floating body, and means for transferring the liquid from the first receptacle to the second receptacle when it is desired to tilt the barge for unloading purposes and to transfer the liquid from the second receptacle to the first receptacle when it is desired to right the barge after unloading.

4. A barge comprising a floating body, a receptacle 2, located to one side thereof above the deck, a receptacle 4 located below the deck, a pipe connecting said receptacles together, a receptacle 5 adapted to contain compressed fluid, a pipe connecting said receptacle 5 with the receptacle 4, and a valve in said pipe.

5. A barge comprising a floating body, a receptacle 2 located to one side of the same and above the deck, a receptacle 4 located below the deck, a pipe connecting the two receptacles together, a receptacle 5 adapted to contain compressed fluid, a pipe connecting receptacle 5 with the receptacle 4, and a valve in said pipe for connecting the receptacle 4 either with the receptacle 5 or with the atmosphere.

6. A barge having a receptacle 2 located above its deck at one side of the same, a receptacle 4 located below the deck, a pipe connecting said receptacles together, a receptacle 3, which in the turned over position of the barge is situated below the receptacle 2 and in the raised position of the barge is located above the plane of the receptacle 4, a compressed air receptacle connected with the receptacle 4, and pipes connecting the receptacles 2, 3 and 4.

In testimony whereof I have signed my name to this specification in the presence of two subscribing witnesses.

ANDERS FREDRIK WIKING.

Witnesses:
BIRGER NORDFELDT,
ANNA SÖDERSTRÖM.

---

Copies of this patent may be obtained for five cents each, by addressing the "Commissioner of Patents, Washington, D. C."